(12) United States Patent
Engh-Halstvedt et al.

(10) Patent No.: US 11,036,644 B2
(45) Date of Patent: Jun. 15, 2021

(54) DATA PROCESSING SYSTEMS

(71) Applicant: ARM Limited, Cambridge (GB)

(72) Inventors: Andreas Due Engh-Halstvedt, Trondheim (NO); Edvard Fielding, Trondheim (NO)

(73) Assignee: Arm Limited, Cambridge (GB)

( * ) Notice: Subject to any disclaimer, the term of this patent is extended or adjusted under 35 U.S.C. 154(b) by 86 days.

(21) Appl. No.: 15/423,497

(22) Filed: Feb. 2, 2017

(65) Prior Publication Data
US 2018/0217934 A1    Aug. 2, 2018

(51) Int. Cl.
| | | |
|---|---|---|
| G06F 12/08 | (2016.01) |
| G06F 12/12 | (2016.01) |
| G06F 12/0897 | (2016.01) |
| G06F 12/0875 | (2016.01) |
| G06F 12/126 | (2016.01) |
| G06F 12/128 | (2016.01) |

(52) U.S. Cl.
CPC ...... *G06F 12/0897* (2013.01); *G06F 12/0875* (2013.01); *G06F 12/126* (2013.01); *G06F 12/128* (2013.01); *G06F 2212/1016* (2013.01); *G06F 2212/302* (2013.01); *G06F 2212/455* (2013.01)

(58) Field of Classification Search
CPC ............. G06F 12/0868; G06F 12/0875; G06F 12/0891; G06F 12/0897; G06F 2212/604; G06F 12/126; G06F 12/128; G06F 2212/455; G06F 2212/1016; G06F 2212/302
See application file for complete search history.

(56) References Cited

U.S. PATENT DOCUMENTS

| | | | | |
|---|---|---|---|---|
| 5,895,485 | A | * | 4/1999 | Loechel .............. G06F 12/0804 711/113 |
| 2004/0128452 | A1 | * | 7/2004 | Schmisseur ......... G06F 12/0804 711/144 |
| 2006/0179174 | A1 | * | 8/2006 | Bockhaus ............. G06F 12/126 710/22 |
| 2006/0271738 | A1 | * | 11/2006 | Tran .................... G06F 9/30043 711/122 |
| 2012/0246652 | A1 | * | 9/2012 | King-Smith .......... G06F 9/4843 718/102 |
| 2014/0281110 | A1 | * | 9/2014 | Duluk, Jr. ............. G06F 13/404 710/313 |
| 2017/0336971 | A1 | * | 11/2017 | Horn .................... G06F 12/0897 |

* cited by examiner

*Primary Examiner* — Masud K Khan
(74) *Attorney, Agent, or Firm* — Vierra Magen Marcus LLP

(57) ABSTRACT

When a data processing operation requires data that is stored in a first cache and the fetching of the data into the first cache is dependent upon data stored in another cache, and an attempt to read the data from the first cache "misses", the data processing operation is added to a record of data processing operations that have missed in the first cache and the data that is required for the data processing operation is fetched into the first cache by reading the data that is required to fetch the data into the first cache from the another cache and then using that data from the another cache to fetch the required data into the first cache. When the data that is required for the data processing operation has been fetched into the first cache, the data processing operation is performed using the fetched data.

21 Claims, 3 Drawing Sheets

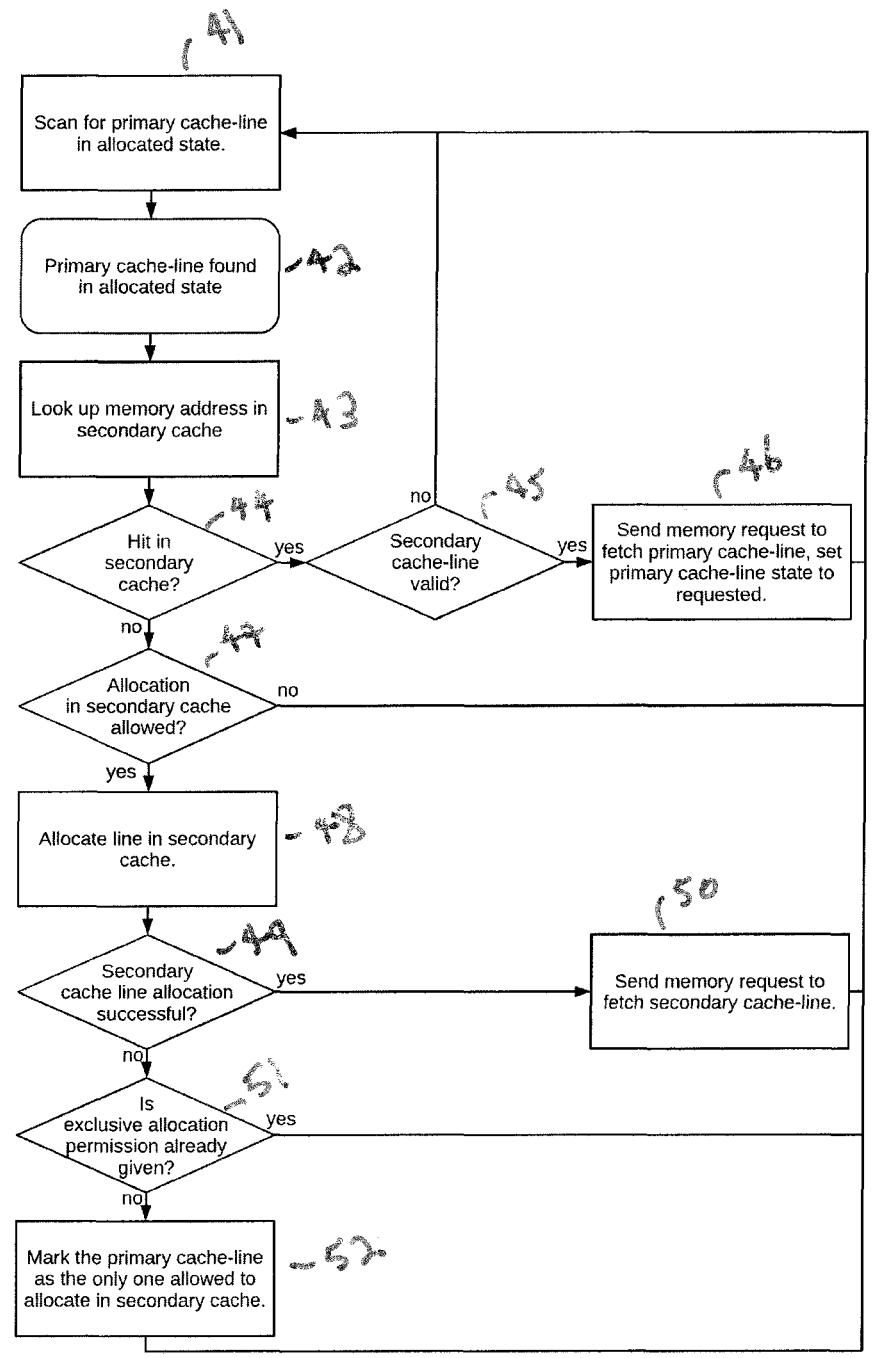

DATA PROCESSING SYSTEMS

BACKGROUND

The technology described herein relates to data processing systems and in particular to cache operation in data processing systems.

Many data processing systems use caches to store data, etc., locally to a processing unit or units so as to reduce the need to fetch data from slower data stores, such as main memory of the data processing system.

In such arrangements, it will first be determined whether the data is available in the appropriate cache. If the data is present in the cache (there is a cache "hit"), then the data will be read from the cache, rather than from the main data store where it is stored, thereby allowing the processing operation to proceed more rapidly.

On the other hand, if the data is not present in the cache (there is a cache "miss"), then the process will operate to first load (fetch) the relevant data into the cache, with the processing operation being stalled until the relevant data has been fetched into the cache.

The Applicants have recognised that there can be situations in which further data from memory is needed in order to be able to fetch data into a cache, which further data may itself be cached and so subject itself to the risk of a cache miss occurring. This may be the case, for example, where the memory address for data to be fetched into a cache for a data processing operation is dependent on further data that may be cached, such that the memory address for fetching the data into the first cache cannot be determined until the further address indicating data has been obtained from its cache.

An example of this is when performing texturing operations in graphics processing systems.

Texturing in graphics processing systems typically uses so-called mip-maps, such that not only must the coordinates within the texture of the desired texture sample (texel) be determined, but it is also necessary to determine which one or more mip-map levels for the texture are to be used (e.g. based on a desired level of detail and/or filtering mode).

The memory address for a given texture sample (texture data element (texel)) for use in a graphics texturing operation may accordingly depend on both the coordinates within the texture of the desired texture sample (texel) to be fetched, and which mip-map level that texture sample is to be fetched from.

In this case therefore in order to be able to fetch a texel from memory into the texel cache, the full address of the texel, which will be dependent not only on the texel coordinates, but also the selected mip-map level, must be determined before making the memory request for the texel data.

In such arrangements, the mip-map address may be stored separately to the main texel cache, e.g. in a further cache that stores the mip-map addresses. In this case therefore, a line fetch for the texel cache will require a "hit" in the further cache that stores the mip-map addresses in order to be able to proceed (as the memory address for the texel cache line fetch will require the mip-map address in order to be able to determine the complete address for the desired texel data in the main memory).

The Applicants believe that there remains scope for improvements to cache operation in arrangements in which the fetching of data into one cache requires data from another cache.

BRIEF DESCRIPTION OF THE DRAWINGS

An embodiment of the technology described herein will now be described by way of example only and with reference to the accompanying drawings, in which:

FIG. 3 is a flow chart detailing steps of the method of cache operation in an embodiment of the technology described herein.

Like reference numerals are used for like components where appropriate in the drawings.

DETAILED DESCRIPTION

Figure 1:
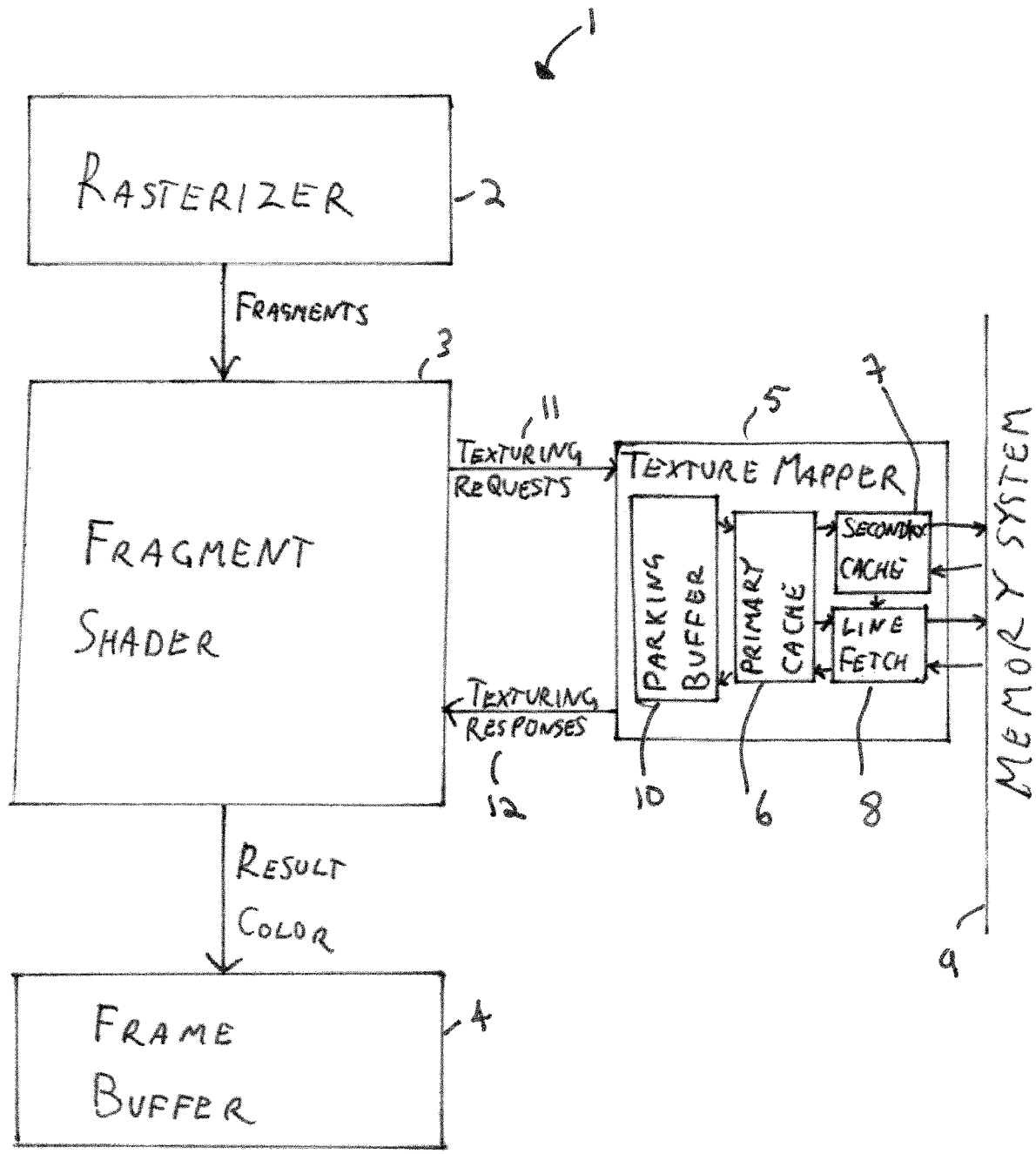
FIG. 1 shows a graphics processing system in accordance with an embodiment of the technology described herein.

A first embodiment of the technology described herein comprises a method of operating a data processing system, the method comprising:

when a data processing operation requires data that is stored in a first cache of the data processing system and the fetching of the data into the first cache for use by the data processing operation is dependent upon data stored in a second cache of the data processing system:

attempting to read the data that is required for the data processing operation from the first cache; and in response to the attempt to read the data that is required for the data processing operation from the first cache other than finding that the data that is required for the data processing operation is stored in the first cache:

stalling the data processing operation;

adding the data processing operation to a record of data processing operations for which data has been attempted to be read from the first cache and for which it was found that the data was not present in the first cache; and fetching the data that is required for the data processing operation into the first cache, wherein fetching the data that is required for the data processing operation into the first cache includes reading the data that is required to fetch the data into the first cache from the second cache and using the data that is required to fetch the data into the first cache read from the second cache to fetch the data required for the data processing operation into the first cache; and when the data that is required for the data processing operation has been fetched into the first cache, identifying from the record of data processing operations the data processing operation awaiting the data that has been fetched into the first cache, reading the fetched data from the first cache for the identified data processing operation and performing the identified data processing operation using the read data.

A second embodiment of the technology described herein comprises a data processing system, the data processing system comprising:

data processing operation circuitry operable to perform a data processing operation;

a first cache operable to store data for use by the data processing circuitry when performing a data processing operation;

a second cache operable to store data required for fetching data into the first cache for use in a data processing operation;

wherein:

the data processing operation circuitry is configured to attempt to read data that is required for a data processing operation from the first cache; and the data processing system further comprises processing circuitry configured to, in response to the attempt to read the data that is required for the data processing operation from the first cache other than finding that the data that is required for the data processing operation is stored in the first cache:

stall the data processing operation;

add the data processing operation to a record of data processing operations for which data has been attempted to be read from the first cache and for which it was found that the data was not present in the first cache;

fetch the data that is required for the data processing operation into the first cache, wherein the fetching the data that is required for the data processing operation into the first cache includes reading the data that is required to fetch the data into the first cache from the second cache and using the data that is required to fetch the data into the first cache read from the second cache to fetch the data required for the data processing operation into the first cache; and when the data that is required for the data processing operation has been fetched into the first cache, identify from the record of data processing operations a data processing operation or operations awaiting the data that has been fetched into the first cache, and cause the data processing operation circuitry to read the fetched data from the first cache for the identified data processing operation or operations and to perform the identified data processing operation or operations using the read data.

The technology described herein relates to arrangements in which the fetching of data into a first (primary) cache is dependent on data that is stored in a second, different cache.

In the technology described herein, when a cache miss occurs in the first, primary cache (i.e. an attempt to read the data that is required for the data processing operation from the first cache other than finds (does not find) that the data that is required for the data processing operation is stored in the first cache (finds that the data that is required for the data processing operation is not stored (is other than stored) in the first cache)), the data processing operation that requires the data is stalled, and added to a record of data processing operations that "missed" in the first, primary cache.

The required data is then fetched into the primary cache. The fetching process includes reading the data required to fetch the data into the first, primary cache from the secondary cache.

Thus, in the technology described herein the reading of the required data from the second cache is triggered by the attempt to read data from the first, primary cache failing (in contrast, e.g., to attempting the data look up in the second cache first, and then only attempting the data look up in the first, primary cache once it is known that the required data is present in the secondary cache), and a record of stalled data processing operations is maintained for the operation of the first, primary cache.

As will be discussed further below, the technology described herein can, particularly in its embodiments, provide a relatively simple and cost-effective mechanism for handling cache misses in arrangements in which the handling of a cache miss in a first, primary cache requires data from a further, secondary cache, whilst still providing relatively large amounts of hit-under-miss and miss-under-miss capability and mechanisms for avoiding livelocks.

The data that is required for the data processing operation and that is attempted to be read from the first cache can be any suitable and desired data to be used in a data processing operation. Correspondingly, the attempting to read that data from the first cache can be performed in any suitable and desired manner, such as, and in an embodiment, in the normal manner for reading data from a cache in the data processing system in question.

Correspondingly, the identification of the situation where the data that is required for the data processing operation is other than stored (is not stored) in the first cache (i.e. there is a "miss" in the first cache) can be identified in any suitable and desired manner, such as, and in an embodiment, in the normal manner for the data processing system in question.

When a "miss" in the first, primary cache occurs, the data processing operation in question is stalled, and added to a record of data processing operations for which data has been attempted to be read from the first cache and for which it was found that data was not present in the first cache (i.e. for which there was a "miss" in the first cache).

The record of the data processing operations for which data has been attempted to be read from the first cache and for which it was found that the data was not present in the first cache (i.e. of those data processing operations that are awaiting data to be fetched into the first, primary cache) can be configured and kept in any suitable and desired manner. In an embodiment a record is kept of plural, and in an embodiment all of the, data processing operations that are awaiting data to be fetched into the first cache. The record should be, and is in an embodiment, such that a data processing operation can be recommenced once (when) the data required for the data processing operation arrives in the first cache.

The record of pending data processing operations may be stored as desired, e.g. in an appropriate buffer.

There should be, and in an embodiment is, only a record of data processing operations kept in response to failed data requests to ("misses" in) the first, primary cache. In other words, there is (in an embodiment) no pending data processing operation record maintained in response to cache transactions that miss in the second (secondary) cache. Thus, there is only a single record of pending data processing operations that is maintained that records those data processing operations whose data requests missed in the first, primary cache.

The record of stalled (parked) data processing operations can be implemented in any suitable and desired manner. In an embodiment an appropriate data structure is maintained to record those data processing operations that are awaiting the fetching of data into the first cache.

In an embodiment, a list of pending data processing operations is kept for each (distinct) set of data that is to be fetched into the first cache (e.g., and in an embodiment, for each cache line that is awaiting data). Thus, for example, and in an embodiment, where plural data processing operations require the same data, each of those data processing operations will be identified as awaiting the loading of that same data into the first, primary cache. Correspondingly, in an embodiment the record of stalled (parked) data processing operations is able to have, and in an embodiment does have, a many-to-one mapping between data processing operations and the data items (the respective fetches) that are to be fetched into the first, primary cache.

The record of stalled (parked) data processing operations and the use of that record is in an embodiment implemented such that the data processing operations that are stalled (parked) are able to be completed in a different order to the order in which the data processing operations were initially attempted (to the order that the data processing operations started in).

In an embodiment the record of stalled data processing operations is in the form of a linked list of pending data processing operations.

The record of pending (parked) data processing operations is (appropriately) checked as data is fetched into the first cache (as the cache memory transaction operations complete), so as to identify one or more, and in an embodiment all, of the operations that are awaiting that data.

Thus, in an embodiment, when a set of data (e.g. a cache line) is loaded into the first, primary cache, the record of data processing operations for which data is being fetched is checked to identify at least one, and in an embodiment plural, and in an embodiment all, of the data processing operations that are awaiting the fetched data. In an embodiment the associated list of data processing operations waiting for the data is identified from the record of the data processing operations that are awaiting the fetching of data into the first cache, so as to identify the data processing operations that are awaiting that data.

The identified waiting operation(s) are then allowed to proceed, using the data fetched into the first cache. Thus, the identified operation(s) are in an embodiment recommenced, such that those data processing operation(s) will read the fetched data from the first, primary cache, and then use that data in the data processing operation.

As well as adding the data processing operation to the record of data processing operations that are awaiting the fetching of data into the first cache when it is found that data that is required for the data processing operation is not present in the first cache (i.e. when a data processing operation encounters a "miss" in the first cache), the fetching of the "missing" data that is required for the data processing operation into the first cache is also triggered. Furthermore, that fetching operation includes reading the data that is required to fetch the data into the first cache from the second cache, and using the data that is required to fetch the data into the first cache read from the second cache to then fetch the data required for the data processing operation into the first cache.

The data that is required to fetch the data into the first cache that is sought from and stored in the second cache can be any suitable and desired data that may be necessary to fetch the data into the first cache. The data that is sought from and stored in the second cache in an embodiment comprises data that is to be used, at least in part (and in an embodiment in part) to determine the storage (memory) address for the data that is to be fetched into the first cache.

It will be appreciated in this regard, that when an attempt is made to read the data that is required to fetch the data into the first cache from the second cache, then that data required to fetch the data into the first cache may already be present in the second cache or it may not be.

In the case where the data required to fetch the data into the first cache is present in the second cache when an attempt is made to read that data from the second cache, then that data can simply be read from the second cache and then used to fetch the data into the first cache.

On the other hand, if the data that is required to fetch the data into the first cache is not present in the second cache when an attempt to read that data from the second cache is made, then the process should, and in an embodiment does, operate to first fetch the data required to fetch the data into the first cache into the second cache, and to then re-attempt to read that data from the second cache once it has been fetched into the second cache.

Thus, in the case where the data that is required to fetch the data for the data processing operation into the first cache is not present in the second cache, a fetch request to load the data into the second cache is in an embodiment sent, and when that fetch request completes, and the data is loaded into the second cache, the operation in an embodiment then proceeds to read that data from the second cache, and then use that fetched data to send a fetch request to load the data required for the data processing operation into the first, primary cache.

Thus, in an embodiment, the fetching of the data that is required for the data processing operation into the first cache in response to the attempt to read data that is required for a data processing operation from the first cache finding that the data that is required for the data processing operation is not stored in the first cache comprises:

attempting to read the data that is required to fetch the data into the first cache from the second cache; and in response to the attempt to read the data that is required to fetch the data for the data processing operation into the first cache finding that the data that is required to fetch the data into the first cache is stored in the second cache, reading that data from the second cache, and using that data to send a fetch request to load the data required for the data processing operation into the first cache;

in response to the attempt to read the data that is required to fetch the data for the data processing operation into the first cache finding that the data that is required to fetch the data into the first cache is not stored in the second cache:
 stalling the fetching of the data for the data processing operation into the first cache;
 fetching the data that is required to fetch the data for the data processing operation into the first cache into the second cache; and
 when the data that is required to fetch the data for the data processing operation into the first cache has been fetched into the second cache, reading that data from the second cache, and using that data to fetch the data required for the data processing operation into the first cache.

Thus, in these arrangements, the reading of the data from the second cache and the, if necessary, fetching of the required data into the second cache, is triggered by and in response to the reading of data in the first cache "missing" in the first cache (i.e. the finding that the required data for a data processing operation is not present in the first cache and so needs to be fetched into that first cache).

The operation to fetch the required data for the data processing operation into the first cache, and the reading, and if necessary, fetching of the data into the second cache, for that purpose, can be implemented and caused to happen in any suitable and desired manner.

In an embodiment, the data requests (fetch requests) that are required for the first, primary cache are tracked, in an embodiment by maintaining an indication of those data requests (fetch requests) that are required for the first, primary cache, with that tracking (record) then being used to trigger and control the fetching of any "missing" data into the first, primary cache.

In an embodiment, the cache lines of the first, primary cache for which data requests (fetch requests) are required are tracked, in an embodiment by maintaining an indication of those cache lines of the first, primary cache for which data requests (fetch requests) are required, with that tracking (record) then being used to trigger and control the fetching of any "missing" data into the first, primary cache.

In an embodiment an indication to indicate that data for a cache line is still to be requested from storage where that data is stored is used (and set) for this purpose. In an embodiment an indication to indicate that a cache line in the first cache has been allocated to receive data and that data for that cache line is still to be requested from storage where that data is stored is used (and set) for this purpose.

Thus, it is in an embodiment tracked which lines in the first, primary cache have been allocated to receive data and for which data for the line is still to be requested from storage where that data is stored.

The tracking (record (indication)) of the data requests (fetches) (and/or cache lines) for which data accordingly needs to be fetched into the first, primary cache can be maintained in any suitable and desired manner.

For example, it would be possible to use an appropriate FIFO (first in first out) arrangement in which, e.g., when there is a miss in the first, primary cache, an appropriate fetch request is added to a FIFO, with the requests in the FIFO then being, e.g. retried in turn.

In this case, when a fetch request is selected from the FIFO for trying, the operation, as discussed above, in an embodiment first attempts to read the required data from the second cache, and if that data is present in the second cache, that data is then used to issue a read request to the memory system to fetch the required data for the data processing operation into the first, primary cache.

On the other hand, if the data to perform the fetch request is not present in the second, cache, then a fetch request will be issued for the data to be fetched into the second cache. Until this data arrives, the original fetch request to fetch the data into the first, primary cache, cannot progress, and so should be and is in an embodiment stalled until the data arrives into the second cache.

Once a fetch request to fetch data into the first, primary cache, has been issued, the process can then move on to the next fetch request in the FIFO, and so on.

In order to allow for the dependency on data in the second cache (and the potential for misses in that second cache), in an embodiment when using a FIFO arrangement for the record of misses in the first, primary cache, the arrangement is constrained to use fully in order processing. This should then ensure immunity to live-locks. In this case therefore, if a fetch request is retried from the FIFO list and needs data fetching into the second (secondary) cache, that fetch request and all other fetch requests are in an embodiment stalled until the data required for the fetch request in question arrives in the second cache (with that fetch request then being allowed to proceed).

The Applicants have recognised that constraining such a FIFO type of arrangement to use fully in order processing may be relatively inefficient. Thus, in an embodiment, the record (indication) of data fetches (fetch requests to be made) for the first, primary cache is not maintained in the form of a FIFO arrangement. Instead, the record (indication) is in an embodiment maintained by using state information for a line or lines of the first, primary cache. In an embodiment plural, and in an embodiment each, line in the first, primary cache has associated state information, and that associated line state information is used to indicate whether a fetch is required for that line. In an embodiment, if there is a miss in the first, primary cache, a cache line is allocated to the miss (if available) and then the state for the allocated cache line is set to indicate that a fetch of data into the cache line is required (and still to be made (started)).

The cache line to allocate in this regard can be selected in any suitable and desired manner, such as by using a cache line allocation mechanism of the data processing system in question (such as a least recently used (LRU) allocation process).

Correspondingly, if a line cannot be allocated at all, that can be, and is in an embodiment, handled in the normal manner for such situations in the data processing system in question.

In an embodiment, a cache line can be indicated as having a state indicating that the line has been allocated to receive data for a data processing operation and that the data for that cache line must be fetched from storage (e.g. main memory) (i.e. that data needs to be fetched for the cache line but the fetch has not yet started). For such an "allocated" cache line, the "tag" (the indicated memory address identifying the data that will be fetched into the cache line) will be valid, but the data in the cache line will not be valid. A subsequent "hit" on such an "allocated" cache line accordingly means that the data processing operation that needs the data to be fetched in the cache line must be stalled (parked), but it is known that the data for that operation will arrive into the cache line at some point.

In an embodiment, a cache line can also be indicated as having a state in which the line has been allocated and the data for the line has been requested from storage (e.g. main memory) (i.e. that the fetch of data for the line has started but has not yet completed). Again, in the case of a line in such a "fetching" state, the tag (address) of the line will be valid, but not the data. Correspondingly a hit on a "fetching" line will mean that the data processing operation must be stalled (parked), but it is known that the data for the data processing operation will be arriving in the cache line (soon) (as the data for the line has already been requested).

In an embodiment a cache line can also be indicated as having an "invalid" state (meaning that the line is not in use and does not contain any valid data), and a "valid" state (meaning that the line contains valid data).

In an embodiment, a (and each) cache line of the cache in question (e.g. the primary cache) can be indicated as having one of four states: invalid (meaning that the line is not in use and does not contain any valid data); allocated (meaning that the line is allocated and the data for it must be fetched); fetching (meaning that the line is allocated and the data for the line has been requested from storage (e.g. main memory)); and valid (meaning that the line contains valid data).

In this embodiment, the fetching of the data for data processing operations that are awaiting data is in an embodiment controlled and triggered by scanning for cache lines in the "allocated" state (i.e. lines which have been allocated for data that must be fetched), and then attempting to fetch data for at least one of (and in an embodiment only one of (at a time)) the lines found to be in the "allocated" state. The cache lines are in an embodiment repeatedly scanned in this manner, to identify lines for fetching in turn. In an embodiment, the next "allocated" line found in the scan is selected for attempting to fetch the data for that line.

In an embodiment, the record of which cache lines are in the "allocated" state is stored as a separate data structure (from the other cache states), such as, and in an embodiment, as a bitmap indicating which cache lines are in the "allocated" state. This should provide a more cost-effective mechanism for scanning for cache lines in the "allocated" state.

In an embodiment, the scan of the cache lines to identify and select allocated lines is performed according to a particular, in an embodiment selected, in an embodiment predefined pattern (order). In an embodiment a scan pattern (order) that is guaranteed to access all allocated lines over a bounded period of time is used. In an embodiment a round-robin scan over the cache lines is used to achieve this (i.e. in which the cache lines are scanned in turn in a round-robin (in a circular) manner).

Thus, in an embodiment, the cache lines are scanned in a round-robin order one after another, and the first cache line found in the scan to be in the "allocated" state is selected for attempting to fetch the data for that cache line.

In an embodiment, the scanning of the cache lines is stopped when there are no (remaining) lines in the "allocated" state. The absence of "allocated" lines in the cache can be determined as desired, e.g. by keeping a record (e.g. count) of the number of "allocated" lines, or, e.g., in the case where a bitmap is used to indicate the allocated lines, by determining whether the bitmap is all-zero.

Once an "allocated" cache line has been selected in this manner, then the fetching of the data for that line into the first, primary cache, is triggered.

As discussed above, to do this, the system in an embodiment first tries to read the data required to fetch the data into the first, primary cache from the second cache. If (when) that data is present in the second cache, then that data can be, and is in an embodiment, read and used to then send a fetch request to load the data required for the data processing operation into the allocated line of the first, primary cache. The state of the allocated cache line in the first, primary cache is in an embodiment then changed to the state "fetching" (as discussed above).

The scan is then continued for the next "allocated" line in the first, primary cache (e.g., and in an embodiment, in a round-robin order as discussed above), so as to attempt to fetch the data for that next "allocated" cache line, and so on.

On the other hand, if (when) the data required to fetch the data into the allocated line for the first, primary cache is not present in the second cache when the read for that data is made to the second cache, then the process in an embodiment operates to trigger the fetching of the required data into the second cache, and to stall the fetch request for the data to be loaded into the first, primary cache until the appropriate data is fetched into the second cache.

It would be possible in this case simply to stall further processing of cache lines and loading of data into the first, primary cache until the appropriate data to allow the "stalled" load into the first, primary cache to proceed is fetched into the second cache. (In other words, the operation in the case of a miss in the second cache, could be constrained to perform fully in order processing, so as to ensure that any fetch into the first, primary cache that encounters a miss in the second cache will be able to proceed.)

However, in an embodiment, when a request (read) for data in the second cache "misses" (finds that the data is not present in that cache), if (when) a cache line is available for receiving the "missing" data in the second cache, then a cache line is allocated for receiving the "missing" data in the second cache, and the system is set (arranged) to ensure that the fetch of the data into the allocated line in the second cache will happen.

This then has the effect of ensuring that the data required to fetch the data into the allocated cache line in the first, primary cache will eventually arrive in the second cache, such that there is no need to stall the entire fetching operation in respect of the first, primary cache.

Accordingly, in these embodiments, if (when) a line is able to be allocated in the second cache, once the line has been allocated in the second cache, then the state of the original line in the first, primary cache is in an embodiment left as "allocated" (so that it will be tried again later), and the process in an embodiment moves on to identify the next "allocated" line in the first, primary cache to attempt to fetch.

This arrangement can provide a very large hit-under-miss and miss-under-miss capability, as potentially every line in the first, primary cache can be "allocated" or "fetching" at the same time.

An assurance that the fetch will happen could be provided in any suitable and desired manner, for example by using a fetch FIFO (by adding the fetch request for the allocated cache line in the second cache to a fetch request FIFO which queues fetch requests for processing one after another). (Such a FIFO-type arrangement for queuing the fetch request into the second cache can be used in the normal manner where the fetch into the second cache is not dependent upon data in any other cache.)

Alternatively, cache line state information could be used to indicate that fetches are required, and to control the performance of fetches, for the second cache, in a similar manner to that discussed above in relation to the first, primary cache.

It should be noted in this regard, that in the case where the fetching data into the second cache is not dependent upon data in any other cache (i.e. is not subject to the risk of a further cache miss occurring in order to be able to fetch that data), then the fetching of data into the second cache can be configured in a more straightforward manner, e.g. in the normal manner for the data processing system in question.

(On the other hand, if the fetching of data into the second cache is also dependent upon data in a further cache, then the operation is in an embodiment configured in a corresponding manner to the operation with respect to the first, primary cache and the second (secondary) cache described herein (and so on, if there are further cache dependencies).)

These arrangements of the present embodiments are particularly suitable for situations where a relatively high hit rate in the second cache is expected. This is likely to be the case for texture caches in graphics processing systems, for example. In such cases in particular, even though the operation in the manner of the present embodiments will continually scan for "allocated" lines in the first, primary cache to process, each "allocated" line will be processed only once if the line "hits" in the second cache. It is only on misses in the second cache that an allocated line would be processed multiple times. In the case where a high hit rate in the second cache is expected, that will give low power consumption in the common case, expected case, of a hit in the second cache.

The above describes the operation in embodiments of the technology described herein when a cache line in the second cache can be allocated for the fetching of data into that cache that is required to then be able to fetch data into the first, primary cache when the request for the data from the second cache is made. However, it could also be possible that there is no available cache line in the second cache available when data is requested to be fetched into that cache.

In an embodiment, when an attempt is made to read data from the second cache, and the data is not present in the second cache, and a cache line in the second cache cannot immediately be allocated to receive that data, then a record is made of which cache line (fetch request) in the first, primary cache, has failed to have a cache line allocated in the second cache, and the process operates to (is configured to) allow only that cache line (fetch request) from the first, primary cache to be allowed to have a cache line in the second cache allocated to it, until a line in the second cache has been allocated to that line (fetch request) in the first, primary cache.

This will then ensure that once a line in the second cache becomes free, the first cache line (fetch request) in the first, primary cache that did not receive a line allocation in the second cache will be allocated that now-free line in the second cache, so that its fetch request can progress (in the manner discussed above).

The identification could, e.g., use a flag or other indicator associated with the cache lines in the first, primary cache, so as to identify a cache line that currently has exclusive cache line allocation permission in the second cache. Alternatively, a single indication (e.g. flag) that the exclusive cache line allocation state has occurred, together with an indicator (e.g. a line index) of the cache line that currently has exclusive cache line allocation permission, could be stored, e.g. with the second cache. Other arrangements would, of course, be possible.

In these arrangements, the process in an embodiment continues the (e.g. round-robin) scan for lines in the first, primary cache to fetch in the manner discussed above, so that it will eventually return to the cache line that failed to allocate a line in the second cache, at which point it will try again to allocate a line in the second cache (which if a line in the second cache has been freed in the meantime will be available due to the locking of the allocation mechanism), or will fail again, and fall to be retried next time it is reached in the scan. (Other arrangements, such as bypassing the scanning mechanism once a cache line becomes free in the second cache would be possible, but an embodiment simply continues with the scanning order, as that may have advantages in terms of preventing livelocks.)

While the scan is going on, although any other lines in the first, primary cache other than the permitted line are not allowed to allocate lines in the second cache even if there is an available line in the second cache, the other lines in the first, primary cache are in an embodiment still able to attempt to read the secondary cache and to proceed with their data fetches, etc., in the event that the data that they require is already present in the second cache (in the event that they "hit" in the second cache). This will then retain most of the hit-under-miss capability of the operation.

The above operation, particularly in combination with the appropriate (e.g. round-robin) scanning of lines in the first, primary cache to fetch, will have the effect of ensuring that all lines in the first, primary cache will ultimately be able to allocate lines in the second cache (and accordingly complete their fetch requests), even if lines are not initially available in the second cache. This, at least when in combination with other features of the technology described herein, can therefore avoid (prevent) livelocks occurring in the event that a cache line is not immediately available in the second cache.

It should be noted in this regard that it is expected that any given data processing system and data processing operation may in the normal course be able to be configured and arranged such that the unavailability of a cache line in the second cache when needed should be a relatively rare occurrence, and/or may only arise in situations in which performance may be relatively bad for other reasons as well, such that a relatively less efficient mechanism for addressing that situation would normally be expected to be acceptable.

Once a line in the second cache has been allocated, a fetch for data into that line will be triggered and the data will arrive in the second cache at some point.

In an embodiment, an allocated cache line in the second cache is locked such that the data fetched into that line cannot be evicted until the fetch request for the allocated line in the first, primary cache that needs the data being fetched into the second cache has used it. By ensuring that the fetched data into the second cache cannot be evicted until the fetch request for the allocated line in the first, primary cache that originally needed that data has used it, a livelock situation can be avoided (prevented).

Any suitable cache line locking mechanism could be used for this purpose. For example, it would be possible to track (to reference count) how many (and which) cache lines in the first, primary cache are waiting for the data to be fetched into the cache line in the second cache (and to, e.g., only release the cache line in the second cache, once all of the allocated lines in the first, primary cache that are waiting for the line to be fetched in the second cache, have used the fetched data).

In an embodiment, it is ensured that fetched data into (a line of) the second cache cannot be evicted until at least the fetch request for the first, primary cache that needed the data fetched into the second cache has used it, by only allowing the cache line in the second cache to be evicted after all the lines in the first, primary cache have been scanned at least once after the data was loaded into the line of the second cache. This will then ensure that the original "allocated" cache line in the first, primary cache that triggered the fetching of the data into the second cache will get to use the data fetched into the second cache before that data is evicted from the second cache.

This is in an embodiment achieved by making sure that the scan of the first, primary cache lines for "allocated" state lines has wrapped a particular, in an embodiment selected, number of times after the data was loaded into the line of the second cache.

This should ensure that all the lines in the first, primary cache will have been scanned at least once while the data is present in the second cache.

Such an arrangement can be achieved as desired. In an embodiment the number of scan passes over the lines in the first, primary cache are counted, and the cache line in the second cache is only allowed to be evicted after a particular, in an embodiment selected, number of scan passes of the lines in the first, primary cache has happened after the data was loaded into the line of the second cache.

In this arrangement, a count of the number of scan passes after the data that has been loaded into the line of the second cache could be kept from the current cache line in the first, primary cache that the scan had reached at the point the data was loaded into the line of the second cache. In this case, the system would need to record the "current" line that the scan had reached, and the data could be locked in the line of the second cache for one scan pass (i.e. until the scan has returned to that "current" line in the primary cache).

Alternatively, a count could be kept of the number of scan passes past the first line in the first, primary cache. In this case, the cache line in the second cache is in an embodiment locked (not allowed to be evicted) until the scan pass of the lines in the first primary cache has wrapped past the first line in the first, primary cache twice (i.e. the process locks the cache line in the second cache for two wraps back to the beginning of the scan of the cache lines in the first, primary cache). This will then ensure that the cache line in the second cache will be locked from anywhere from one to two full scans of the cache lines in the first, primary cache (on average for about 1.5 scans of the cache lines in the first, primary cache), thereby ensuring that the data will be present in the line of the second cache while all the lines in the first, primary cache have been scanned at least once while the data is present in the second cache) (and avoids the need to store the current line in the first, primary cache that was being scanned when data arrived in the line of the second cache).

This is in an embodiment achieved by setting a count (a reference count) for a newly loaded line in the second cache to a value of 2 once the data arrives in the cache line (the cache line becomes valid), and then decrementing the count for that line in the second cache by one every time the scan of the cache lines for "allocated" state lines in the first, primary cache, wraps back to the first line in the first, primary cache. Then, once the count for a line in the second cache reaches zero, that line is considered as being available for re-use (is no longer locked).

This will ensure that the original cache line that triggered the fetching of the data (line) for the second cache can use the data that is fetched into the secondary cache and also that any other lines in the primary cache in the first, primary cache that need that data can use it.

In an embodiment, if the scanning of the first, primary cache determines that there are no allocated lines awaiting the fetching of data in the first, primary cache, then all scan pass counts for lines in the second cache can be, and are in an embodiment, dropped. This may be done, e.g., by continuing scanning the lines in the first, primary cache until all the scan pass counts for lines in the second cache reach zero. This should not be too onerous, as scanning an all zero bitmap (for example) should be very fast.

When the required data is present in the second cache, and the fetch request for the cache line in the first, primary cache that needs that data is tried, the data will be read from the second cache, and used to fetch the data into the relevant cache line in the first, primary cache.

In all cases, once the fetched data arrives in the cache line in the first, primary cache, the state of that line is in an embodiment changed to "valid" (i.e. indicating that the cache line now contains valid data). The data processing operations that require the fetched data may then start using that data. Thus, once a cache line is changed to state "valid", the record of pending data processing operations is in an embodiment checked to determine which data processing operation(s) are awaiting the data that was fetched into the cache line, and those data processing operation(s) are then triggered to proceed using the data from the cache line.

The technology described herein is described above with particular reference to the operation where the data required for a data processing operation is not present in the first, primary cache. In the case where the data is present in the first, primary cache when it is attempted to be read from that cache for the data processing operation, then the data processing operation can, and in an embodiment does, simply read the data from the first, primary cache and perform the data processing operation using that data.

Also, although the operation in the above manner could be performed each and every time a data processing operation fails to fetch data from the first, primary cache, in an embodiment, where a data processing operation attempts to fetch data from the first, primary cache that has previously been attempted to be fetched by a previous (and earlier) data processing operation, such that the process of fetching that data into the first, primary cache is already in progress, the subsequent (and in an embodiment each subsequent) data processing operation that requires the same data is in an embodiment simply added to the record of data processing operations for which data has been attempted to be read from the first cache and for which it was found that data was not present in the first cache, but without triggering another (a subsequent) fetch of that data into the first, primary cache.

In other words, for any data processing operation that "misses" in the first, primary cache, it is in an embodiment determined whether the data processing operation requires data that is already being or to be fetched into the first, primary cache, and in that case, that data processing operation does not trigger another instance of fetching that data into the first, primary cache, but is simply "parked" to await the previously triggered fetching of that data into the first, primary cache.

Correspondingly, in the case where an attempt to read data from the second cache finds that data is not present in the second cache, but is already being fetched or to be fetched into the second cache (i.e. the cache line in the second cache has been allocated to receive that data) (there is a "hit" in the second cache but the cache line is not valid), then again in an embodiment another instance of fetching that data into the second cache is not triggered, but the cache line in the first, primary cache that requires that data that is already being or to be fetched into the second cache is left in its "allocated" state, and the scan for "allocated" cache lines in the first, primary cache continued, so that the cache line in the first, primary cache, will in time be tried again, by which time the required data may have been fetched into the second cache.

Although the technology described herein has been described above primarily with reference to a given data processing operation, the operation in the manner of the technology described herein can be, and is in an embodiment, performed in respect of plural data processing operations, e.g., and in an embodiment, in respect of each data processing operation that requires data from the first cache.

The caches in the technology described herein can be any suitable and desired cache memory. Each cache should, and in an embodiment does, have a plurality of cache lines, each able to store respective data. Correspondingly, the data that is fetched and loaded into the caches is in an embodiment stored in an appropriate storage of the data processing system and fetched from that storage, such as, and in an embodiment, an appropriate memory, e.g., and in an embodiment main memory, of the data processing system.

The operation of looking up and, if necessary, fetching of data into the first, primary, and second caches in the manner of the technology described herein can be implemented in any suitable and desired manner. Thus, there may, for example, be, and is in an embodiment, an appropriate communication path or paths between the first, primary cache, and the second cache, and corresponding processing logic, provided for this purpose.

Subject to the specific arrangements and embodiments of the technology described herein described above, the looking up of data in the caches and the fetching of data into the caches, e.g. from main memory, can otherwise be performed in any suitable and desired manner, such as, and in an embodiment, in the normal manner for cache look-ups and data fetches in the data processing system in question.

The technology described herein can be used in any data processing system where the handling of cache misses may be dependent upon data stored in another cache. As discussed above, the Applicants have recognised that such situations can in particular arise in graphics processing systems. Thus, in an embodiment, the data processing system is a graphics processing system, and, correspondingly, the data processing operation is a graphics processing operation.

As discussed above, the Applicants have recognised that in the case of graphics processing systems, a particular example of cache operation that may be dependent upon data stored in another cache is in graphics texturing operations. Thus, in an embodiment, the data processing operation is a graphics texturing operation. In this case, the data that is stored in the first, primary cache, is in an embodiment texture data (in an embodiment texture sample (texel) data), and the data that is stored in the second cache is in an embodiment mip-map data, and in an embodiment mip-map memory address data.

The Applicants have recognised in this regard that trying to fetch the required data from the texel cache first means that the secondary, mipmap address cache only needs to be accessed when the requested texels cannot be found in the texel cache (when there is a cache miss in the texel cache). This will then be more efficient in the common case where the requested texels can be found in the texel cache (where there is a cache hit in the first, primary cache), as compared, for example, to an arrangement in which the mipmap address cache containing the mipmap addresses and the texel cache are addressed by first looking up the mipmap address in the mipmap cache, then performing an address calculation, and finally having an address-based texture cache (which will accordingly always require accessing two caches for each accessed texel).

In particular, by, as discussed above, allowing cache misses in the first, primary cache to be handled in an efficient manner, the technology described herein facilitates having an arrangement in which, in a graphics processing system, the texel data is attempted to be read from its cache first, without also reading the mipmap address data, with the mipmap address data then only being read in the event of a miss in the texel data cache. Accordingly, the technology described herein, in its embodiments at least, can facilitate more efficient cache operation in the common case where the requested texels are present in the texel cache, whilst still providing a suitable and sufficiently efficient mechanism for handling the situation where the texel data is not present in the texel cache, as compared, for example, to arrangements in which both caches (the texel cache and the cache containing mipmap addresses) are accessed independently of each other (but which would then always require accessing two caches for each accessed texel).

Another example of cache operation where the technology described herein may be particularly useful is in the context of a memory management unit (MMU), for example where, the first, primary cache stores fully resolved page table entries such that a memory mapping translation can be completed with only a single lookup on a hit in that first, primary cache, but on a miss in that first, primary cache, multiple dependent lookups in another cache (or series of caches), would be required to perform multiple levels of page table walks.

The technology described herein can be used for all forms of output that a graphics processing system may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

The technology described herein is applicable to any suitable form or configuration of graphics processor. It is particularly applicable to tile-based graphics processors and graphics processing systems. Thus in an embodiment, the graphics processing system is a tile-based system.

In an embodiment, the data, e.g. graphics, processing system comprises, and/or is in communication with, one or more memories and/or memory devices that store the data described herein, and/or that store software for performing the processes described herein. The data, e.g. graphics, processing system may also be in communication with a host microprocessor, and/or with a display for displaying images based on the output of the data, e.g. graphics, processing system.

The technology described herein can be implemented in any suitable data processing system that uses caches, such as a suitably configured micro-processor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system can otherwise include any one or more or all of the usual functional units, etc., that data, e.g. graphics, processing systems include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

The technology described herein relates to cache operation in data processing systems in which the fetching of data into a first (primary) cache is dependent on data that is stored in another (secondary) cache.

An embodiment of the technology described herein will now be described with reference to the fetching and use of texture data in a graphics processing system.

When a computer graphics image is to be displayed, it is usually first defined as a series of primitives (polygons), which primitives are then divided (rasterised) into graphics fragments for graphics rendering in turn. During a graphics rendering operation, the renderer will modify the (e.g.) colour (red, green and blue, RGB) and transparency (alpha, a) data associated with each fragment so that the fragments can be, e.g. displayed correctly. Once the fragments have fully traversed the renderer, then their associated data values are stored in memory, ready for output, e.g. for display.

FIG. 1 shows schematically a graphics processing system comprising a graphics processing pipeline 1 that may be operated in accordance with the technology described herein.

FIG. 1 shows the main elements and pipeline stages of the graphics processing pipeline 1 and graphics processing system that are relevant to the operation of the present embodiment. As will be appreciated by those skilled in the art there may be other elements of the graphics processing system that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing system as shown in FIG. 1 may be implemented as desired and will accordingly comprise, e.g., appropriate circuitry and/or processing logic, etc., for performing the necessary operation and functions.

The graphics processing system shown in FIG. 1 is a tile-based system. The graphics processing pipeline 1 will thus produce tiles of a render output data array, such as an output frame, to be generated. (The technology described herein is equally applicable to other systems, such as immediate mode rendering systems.) The output data array may typically be an output frame intended for display on a display device, such as a screen or printer, but may also, for example, comprise a "render to texture" output of the graphics processor, etc.

FIG. 1 shows schematically the pipeline stages after the graphics primitives (polygons) for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processing pipeline 1.

As shown in FIG. 1, this part of the graphics processing pipeline 1 includes a rasteriser 2 and a rendering stage (renderer) in the form of a fragment shading stage (fragment shader) 3. The pipeline also includes and/or has access to (is in communication with) appropriate memory 9 for storing the data that the pipeline will use and/or generate, such as a depth and stencil buffer(s), tile buffers, a frame buffer 4, texture maps, etc.

The rasteriser 2 operates to rasterise the primitives making up the render output (e.g. the image to be displayed) into individual graphics fragments for processing. To do this, the rasteriser 2 receives graphics primitives to be rendered, rasterises the primitives to sampling points and generates graphics fragments having appropriate positions (representing appropriate sampling positions) for rendering the primitives.

Fragments generated by the rasteriser 2 are sent onwards to the fragment shading stage 3 (the renderer), as shown in FIG. 1. The fragments may be subjected to early culling tests, such as depth tests, before being sent to the fragment shader 3, if desired.

The fragment shading stage 3 performs the appropriate fragment processing (rendering) operations on the fragments it receives, so as to process the fragments to generate the appropriate rendered fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. In the present embodiment, the fragment shading stage 3 is in the form of a shader pipeline (a programmable fragment shader), but other arrangements, such as the use also or instead of fixed function fragment shading units would be possible, if desired.

The output fragment data values (the result colours) are written to appropriate tile buffers (not shown) that store an appropriate, e.g. colour, value for each sampling point that the buffers represent (in essence for each sampling point of the tile that is being processed). Once each tile has been processed, its data is exported from the tile buffers to a frame buffer 4 in a main memory 9 for storage, and the next tile is then processed, and so on, until sufficient tiles have been processed to generate the entire render output (e.g. frame (image) to be displayed).

The fragments may be subjected to any remaining operations necessary on the fragments, such as depth and stencil tests, blending with the framebuffer, dither, etc. (not shown), before being written to the tile and/or frame buffers, if desired.

Other arrangements for the graphics processing pipeline 1 would, of course, be possible.

As shown in FIG. 1, as part of its operation the fragment shader 3 will use textures when shading the fragments it receives from the rasteriser 2, and as part of that texturing process will request texture sample data (texels) from a texture mapper 5 of the graphics processing system.

As shown in FIG. 1, the texture mapper 5 comprises a primary, "texel" cache 6 which stores texture sample (texel) data. There is also a secondary "surface descriptor" cache 7 which stores texture mipmap memory address data. A line fetch pipeline 8 is operable to fetch data into both the primary cache 6 and the secondary cache 7 from the main memory 9 of or accessible to the graphics processing system.

The texture mapper 5 also includes a parking buffer 10 which is used to record those texture requests from the fragment shader 3 that are awaiting the fetching of data into the primary, texel cache 6. Thus texture sample requests 11 from the fragment shader 3 are "parked" in the parking buffer 10 while the cache lines that they depend on are being fetched.

The parking buffer 10 is a data structure used to record those texturing requests 11 for which data was not present in the primary, texel cache 6 when the texture sample request was made for a texturing operation by the fragment shader 3. In the present embodiment, the parking buffer 10 is configured as a linked list of all pending texture processing operations for each outstanding cache memory transaction. As a cache memory transaction completes (the data is fetched into the cache line), the associated link list is processed and all waiting texturing operations are found and processed.

Other arrangements for the parking buffer 10 would, of course, be possible.

Figure 2:
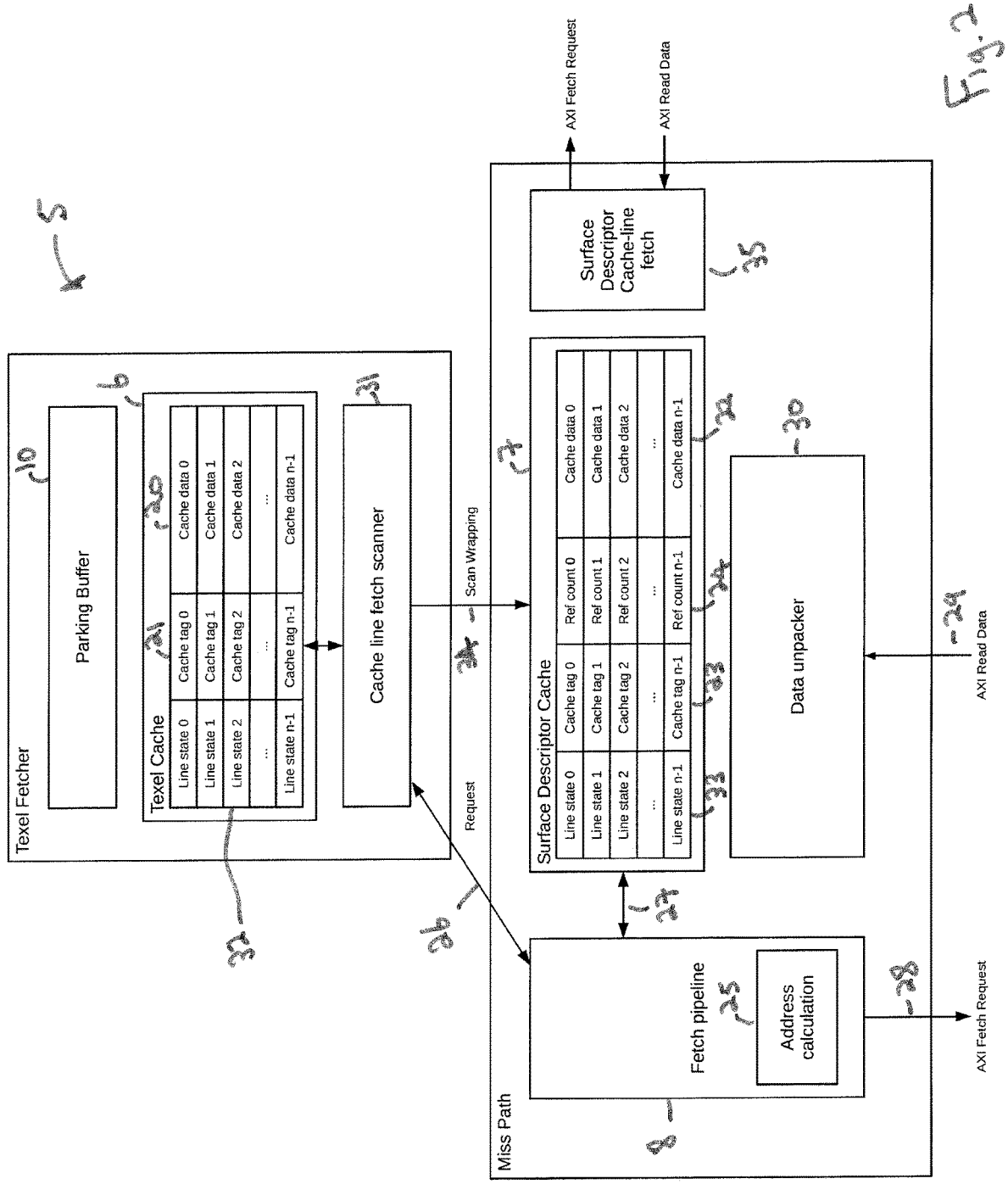
FIG. 2 shows a cache arrangement of the graphics processing system shown in FIG. 1.

FIG. 2 shows the cache arrangement of the texture mapper 5 in more detail.

As shown in FIG. 2, the primary, texel cache 6 has a plurality of cache lines each storing respective texel (texture sample) data 20. Each line in the texel cache 6 is tagged with a tag 21 which in the present embodiment comprises a {Texture ID, mipmap, texel x/y} tuple.

The secondary, surface descriptor cache 7 correspondingly comprises a plurality of cache lines each storing in the present embodiment respective mipmap memory address data as their data 22 and being tagged with a tag 23 which in the present embodiment comprises a {Texture ID, MipMap} tuple (i.e. the identity of the mipmap that the memory address data corresponds to).

As shown in FIG. 2, each cache line in the surface descriptor, secondary cache 7 also has an associated reference count 24. The use of this reference count will be discussed further below.

In the arrangement of this embodiment, in order to be able to fetch data into the primary, texel cache 6, the full memory address for the required data must be calculated 25 by the fetch pipeline 8. In order to be able to calculate the full address for the texel data, the address of the mipmap in question from the secondary, surface descriptor cache 7 is required. Thus, as shown in FIG. 2, when there is a request 26 for fetching data for a cache line into the texel cache 6, the fetch pipeline 8 will need to read 27 the corresponding mipmap address from the secondary, surface descriptor cache 7. Once it has that address, the fetch pipeline 8 can then issue the fetch request 28 for the texel data required for the texel cache 6.

When the requested data returns 29 from the main memory, a data unpacker 30 unpacks that data and loads it into the appropriate cache line.

There is also a corresponding cache line fetch and data unpacker module 35 for fetching mipmap address data into the secondary, surface descriptor cache 7.

FIG. 2 also shows a cache line fetch scanner 31. The cache line fetch scanner 31 operates to scan the primary, texel cache 6 for lines that need data fetching, and to trigger fetches for that data. This operation will be discussed in more detail below.

As can be seen from the above, a line fetch for the primary, texel cache 7 requires data (a "hit") in the secondary, surface descriptor cache 7 in order to be able to proceed. The operation of the caches in the texture mapper 5 in the present embodiment to allow for this operation will now be described in more detail and with reference to FIG. 3.

A texturing operation to be performed by the fragment shader 3 in the present embodiment may comprise, for example, identifying four texture sample requests in a 2×2 sample position formation that are required, and then calculating the derivatives of the texture coordinates across those sample positions and determining a desired level of detail for the texturing operation. The process may then select one or more mipmap levels for the texture based on the level of detail, and, e.g., the sample filtering mode to be used. The texture elements (texels) which must be read for the selected coordinates in the selected mipmap levels will then be determined and those selected texels fetched by the texture mapper 5 from the texel cache 6. Once the selected texels are returned, they are filtered (e.g. bilinearly interpolated) to determine the required texture sample data, which may then be applied to the sampling position or positions in question, e.g. to apply the texture to the sampling position or positions.

The textures themselves will be stored as a set of mipmaps in the main memory 9 of the graphics processing system, and respective texels from the mipmaps will be fetched by the texture mapper 5 into the texel cache 6 for use then by the fragment shader 3 as required.

The present embodiment relates in particular to the operation when the fragment shader 3 sends a texture sample request 11 to the texture mapper 5.

The operation starts when the fragment shader 3 sends a texturing request 11 to the texture mapper for a texel or texels (for texture sample data).

In response to this texturing request 11, it is first determined whether the requested texel data is already stored in the primary, texel cache 6. If the requested data is present in the texel cache 6, then that data is returned 12 in response to the texturing request 11 to the fragment shader 3 (and the fragment shader 3 then uses that data to perform its texturing operation).

On the other hand, if it is found for a texturing request 11 that the texel data required by that request is not present in the primary, texel cache 6 (i.e. there is a "miss" in the texel cache 6), then the texel data (the cache line) for that texturing request must first be fetched into the primary, texel cache 6 from the main memory 9. In this situation therefore, the texture processing operation that requires the texture data is stalled and added to the record of stalled (parked) texturing requests (operations) in the parking buffer 10.

The required texel data (texel cache line) must then be fetched before the texturing operation that requires that texel data can proceed.

To facilitate the fetching of texel data (cache lines) into the texel cache 6, in the present embodiment, each line in the texel cache 6 can be indicated as being in one of four line states 32: invalid (meaning the line is not in use and does not contain any valid data); valid (meaning that the line contains valid data); allocated (meaning that the line is allocated to receive texture data, but that data (i.e. the line) must be fetched (in this case the tag (address) for the cache line will be valid, but not the data in the line, and a hit on an "allocated" line means that the texturing request must be parked, but the data will arrive at some point); and "fetching" (requested) (meaning that the line has been allocated to receive data for a texture request and that that data has been requested from the main memory (thus the address (tag) for the line will be valid but not the data, and a hit on a "fetching" line means that the texturing request must be parked, but the data will (should) arrive soon (has already been requested from the main memory)).

These line states are then used to control the fetching of data into the primary, texel cache 6.

In particular, when there is a miss in the texel cache 6 by a texturing request, a cache line is allocated to that texturing request (i.e. to receive data required for that texturing request), and the line state for that allocated line is set to "allocated" to indicate that a fetch of data into that line is required.

The cache line to allocate can be selected in any suitable and desired manner, e.g. using an appropriate cache line reuse/replacement algorithm. If there is no free line available to allocate to a texture request, then that situation can be dealt with in the normal manner for the graphics processing system when a cache line cannot be allocated.

In the present embodiment, a data processing operation is only added to the parking buffer 10 when a line in the primary cache 6 can be allocated to that data processing operation. This then ensures that all the data processing operations recorded in the parking buffer 10 have an allocated cache line and thereby simplifies the arrangement and operation of the system. This is unlikely to have any significant detrimental effect on the operation, as a situation where there are no cache lines available for allocation in the first, primary cache is likely only to happen in rare cases where large amounts of data is already being awaited anyway.

Other arrangements would, of course, be possible, if desired.

The cache line fetch scanner 31 then operates to scan the texel cache 6 for all lines in the "allocated" state. In the present embodiment the cache line fetch scanner 31 performs a round-robin scan over the cache lines to identify cache lines in the "allocated" state. Using a round-robin mechanism facilitates strict progress guarantees in the embodiment of the technology described herein. When the scan finds a cache line in the "allocated" state, it operates to then try to fetch the data for that cache line (step 41, FIG. 3). To facilitate this scanning operation, the data indicating whether the cache lines are in the "allocated" state or not could be stored as a separate data structure, such as a bitmap, separate from the normal cache states, if desired.

The cache line fetch scanner 31 is also configured to stop scanning when there are no lines in the texel cache 6 that are in the "allocated" state. This could be done, e.g., either by counting the number of "allocated" lines, or by detecting if the, e.g., "allocated lines" bitmap is all zero.

As shown in FIG. 3, once the cache line fetch scanner's scan finds a cache line in the allocated state (step 42, FIG. 3), it then sends an appropriate request to the fetch pipeline 8 which then performs a lookup 27 (step 43, FIG. 3) in the secondary, surface descriptor cache 7 to determine if the required mipmap address is stored in the surface descriptor cache 7.

If there is a cache line in the surface descriptor cache 7 for storing the mipmap address (i.e. there is a hit in the secondary, surface descriptor cache 7) (step 44, FIG. 3), it is then determined if that cache line in the secondary, surface descriptor cache 7 is valid (contains valid data) (step 45, FIG. 3). If so, then the fetch pipeline 8 can read the address data from the secondary, surface descriptor cache 7 and calculate 25 the correct address for the required texel sample and issue the memory request 28 for that texel data. The state of the texel cache line in question is then changed to state "fetching" ("requested") to indicate that the texture data for that cache line has been requested from the main memory (step 46, FIG. 3).

The cache line fetch scanner 31 can then continue its scan to find the next primary texel cache line in the "allocated" state.

Once the requested data arrives 29 from the main memory, it is unpacked by the data unpacker 30 and loaded into the cache line in question in the primary, texel cache 6. The cache line state is changed to state "valid", and the parking buffer 10 starts using the data. Thus, the texturing operations (texture requests) waiting for that data recorded in the parking buffer 10 are then identified and triggered to start using the fetched data.

If the secondary cache line is found not to be valid at step 45, then the cache line in the primary, texel cache 6 is left in its "allocated" state, and the cache line fetch scanner 31 continues its scan for the next line in the primary, texel cache 6 in the allocated state (step 41, FIG. 3).

On the other hand, if the fetch pipeline 8 when it looks up 27 the mipmap address in the surface descriptor cache 7 finds that there isn't a cache line for storing the address in the surface descriptor cache 7 (i.e. it "misses" in the secondary, surface descriptor cache 7) (step 44, FIG. 3), it is determined whether the cache line in the primary, texel cache 6 that "missed" in the secondary, surface descriptor cache 7 is allowed to be allocated a line in the secondary, surface descriptor cache 7 (step 47, FIG. 3).

This determination comprises determining whether the secondary, surface descriptor cache 7 is currently in the "exclusive" allocation state discussed below, in which only a single line in the primary cache 6 is allowed to be allocated a cache line in the secondary, surface descriptor cache 7, or not, and, if it is in the "exclusive" allocation state, then determining whether the current cache line in the primary, texel cache 6 that requires the allocation of a line in the secondary, surface descriptor cache 7 is the cache line in the primary, texel cache 6 that currently has the "exclusive" allocation permission in the secondary, surface descriptor cache 7.

If it is determined that the secondary, surface descriptor cache 7 is in the "exclusive" allocation state and that the current texel cache line that requires the allocation of a line in the secondary, surface descriptor cache 7 is not the cache line in the primary, texel cache 6 that currently has the "exclusive" allocation permission (i.e. such that the allocation of a line in the surface descriptor cache 7 to the cache line in the primary, texel cache 6 in question is not currently permitted), then as shown in FIG. 3, the cache line fetch scanner 31 simply continues its scan to find the next primary texel cache line in the "allocated" state without allocating a line in the secondary, surface descriptor cache 7 to the current cache line in the primary, texel cache, and that cache line in the primary, texel cache is left in the "allocated" state.

On the other hand, if the current cache line in the primary, texel cache 6 is determined to be allowed to be allocated a line in the secondary, surface descriptor cache 7 at step 47, then as shown in FIG. 3, an attempt is made to allocate a line in the secondary, surface descriptor cache for the missing mipmap address data for that primary cache line (step 48). This allocation of a cache line for the required mipmap address data in the surface descriptor cache 7 can be performed as desired, for example using a suitable cache line replacement process.

If a cache line in the surface descriptor cache 7 can be (and is) allocated for the mipmap address data that is required (step 49, FIG. 3), then as a line in the secondary, surface descriptor cache 7 has successfully been allocated, if the secondary, surface descriptor cache 7 is currently in the "exclusive" allocation state, that "exclusive" allocation state is disabled (e.g. at step 49, FIG. 3), so as to allow all cache lines in the primary, texel cache to be able to have lines in the secondary, surface descriptor cache 7 allocated. (In other words, the "exclusive" allocation state is disabled, once an allocation of a cache line in the secondary cache 7 has succeeded.)

If a cache line in the surface descriptor cache 7 can be (and is) allocated for the mipmap address data that is required (step 49, FIG. 3), the process is then configured to ensure that that data will be fetched into that cache line (at some point in the future). In the present embodiment, it is ensured that the data will be fetched into the allocated line in the secondary, surface descriptor cache 7 by using a corresponding cache line "state" arrangement 33 to identify cache lines for which data needs to be fetched as described herein for the texel cache 6. Other arrangements, such as using a fetch request FIFO for this purpose would be possible, if desired.

In this arrangement, if a line in the secondary, surface descriptor cache can be allocated for the required mipmap address data, then a memory request will be sent at some point to fetch the mipmap address data into the allocated line in the surface descriptor cache 7 (step 50, FIG. 3). Accordingly, the cache line fetch scanner 31 can progress to look for the next cache line in the texel cache 6 in the allocated state for fetching (step 41, FIG. 3).

Thus, the fetching operation for the cache line in the primary, texel cache 6 that encountered the miss in the secondary, surface descriptor cache 7 is dropped and that cache line is left in the "allocated" state. The cache line fetch scanner 31 then continues its scan to look for the next cache line in the texel cache 6 that is in the allocated state (step 41, FIG. 3).

As the cache line in the texel cache 6 that "missed" in the secondary, surface descriptor cache is left in the "allocated" state, it will be picked up again later by the cache line fetch scanner 31 as it performs its scan. This can then give a very large hit-under-miss and miss-under-miss capability, as potentially every line in the texel cache 6 can be being "allocated" or "fetching" ("requested") at the same time.

In the present embodiment, in order to ensure that mipmap address data that has been fetched into the secondary, surface descriptor cache 7 in response to a "miss" for that data in the surface descriptor cache 7 is available for cache line fetch for the primary, texel cache 6 that requires it, as shown in FIG. 2 each cache line in the secondary, surface descriptor cache 7 has a reference count 24 associated with it. This reference count 24 is used to count how many scan passes of the texel cache 6 the cache line fetch scanner 31 has performed after the data that is fetched into the secondary, surface descriptor cache 7 has been loaded into the line in that cache.

In particular, once data is fetched into a cache line in the surface descriptor cache 7 (the surface descriptor cache line becomes valid), the reference count 24 for that cache line is set to 2, and is decremented every time the scan of the texel cache 6 by the cache line fetch scanner 31 wraps 34 back to the first line in the primary cache 6. The cache line in the secondary, surface descriptor cache 7 is only denoted as being available for replacement once (and when) its reference count 24 is zero.

This then has the effect of ensuring that all of the lines in the texel cache will have been scanned by the cache line fetch scanner 31 after data has been fetched into a cache line in the surface descriptor cache 7, before the data can be evicted from the surface descriptor cache 7. This should ensure that not only the original requester for the data in the surface descriptor cache 7 should be able to use that data before it is evicted, but should also ensure that all other cache lines in the texel cache 6 that require that data should be able to use it before it is evicted.

In the present embodiment, if the scanning of the texel cache 6 is stopped when there are no lines in the "allocated" state in the texel cache 6, then in an embodiment all the reference counts 24 for the cache lines in the secondary, surface descriptor cache 7 are also dropped. This may be done, for example, by continuing scanning until all the reference counts are zero and then stopping.

In the case where a texel fetch request misses in the secondary, surface descriptor cache 7 but is unable to allocate a line in the surface descriptor cache 7 (step 49, FIG. 3), then it is recorded which cache line in the primary, texel cache 6 failed to allocate a line in the secondary, surface descriptor cache 7, and the operation is configured such that only that line in the texel cache 6 is allowed to be allocated a line in the surface descriptor cache 7 until that line in the texel cache 6 has had a line in the secondary, surface descriptor cache 7 allocated for its fetch.

Thus, as shown in FIG. 3, if the attempt to allocate a line in the secondary, surface descriptor cache is unsuccessful at step 48, it is then determined whether any other lines in the texel cache 6 already have exclusive cache line allocation permission for the secondary, surface descriptor cache 7 (step 51).

If there isn't a line in the texel cache 6 that already has "exclusive allocation" permission in the surface descriptor cache 7, then the line in the primary, texel cache 6 that missed in the secondary, surface descriptor cache 7 is marked as being the texel cache line 6 that is the only one allowed to allocate a line in the surface descriptor cache 7

(step 52, FIG. 3), and the secondary, surface descriptor cache 7 is placed in (and noted as being in) an "exclusive" cache line allocation state.

The cache line in the primary, texel cache 6 is then left in its "allocated" state, and the cache line fetch scanner 31 continues its scan for the next line in the primary, texel cache 6 in the allocated state (step 41, FIG. 3).

Correspondingly, if it is found at step 51 that a cache line in the primary, texel cache 6 already has exclusive allocation permission in the secondary, surface descriptor cache 7, then the new "failing" cache line is not given exclusive allocation permission in the secondary, surface descriptor cache 7 and is left in the "allocated" state. The cache line fetch scanner 31 continues its scan for other cache lines in the texel cache 6 in the allocated state (step 41, FIG. 3).

As the primary, texel cache 6 line scan is continued, the cache line fetch scanner 31 will again identify cache lines in the allocated state to attempt to fetch data as discussed above. It will then perform the appropriate fetch request for those cache lines and if those cache lines "hit" in the secondary, surface descriptor cache 7, then their fetch requests can proceed in the normal manner. This retains most of the hit-under-miss capability of the arrangement of the present embodiment.

As the cache line fetch scanner 31 is allowed to continue its scan, once a cache line in the secondary, surface descriptor cache 7 becomes free, that cache line scanning mechanism will come to try the original, "failing" cache line in the primary, texel cache 6 again. At this point, because that "failing" cache line in the primary, texel cache 6 has exclusive allocation permission in the secondary, surface descriptor cache 7, that line in the primary, texel cache 6 will at that point be guaranteed to be able to allocate the free line in the secondary, surface descriptor cache 7, such that the mipmap address data for it can be fetched into the surface descriptor cache 7 and its fetch request can and will accordingly eventually proceed.

The process can then continue with the normal operation with all primary, texel cache 6 cache lines that "miss" in the secondary, surface descriptor cache 7 being allowed to allocate lines in the secondary, surface descriptor cache 7, until again a line fails to allocate a line in the secondary, surface descriptor cache 7, at which point the operation reverts to giving that "failed" cache line exclusive permission to allocate a line in the secondary, surface descriptor cache 7, and so on.

The above operation of the present embodiment should ensure that there is livelock-free progress, even in a worst case scenario, where the secondary, surface descriptor cache 7 is full of locked entries and most of the lines in the primary, texel cache 6 miss on separate unique mipmap addresses. Using the above arrangement, and in particular the restriction on allocation permissions and the strict round-robin scan of lines to fetch used by the cache fetch line scanner 31, will still ensure that all the lines in the texel cache 6 will be able to allocate lines in the surface descriptor cache 7 over time. The two-step reference count locking of the data in the surface descriptor cache 7 will then guarantee that the fetched data will be used by the line in the texel cache 6 that requires it before it can be evicted.

Although the present embodiment has been described with particular reference to the operation of graphics processing systems (and in particular in relation to texture data in graphics processing systems), the technology described herein can be used in any data processing system where the fetching of data into one cache is dependent upon data in another cache (e.g. in particular where a large amount of miss-under-miss or hit-under-miss capability is desired).

It can be seen from the above that the technology described herein, in its embodiments at least, can provide a large amount of miss-under-miss and hit-under-miss capability in arrangements where the fetching of data into one cache is dependent upon data in another cache. This is achieved in the embodiments of the technology described herein at least by keeping a record of those data processing operations that have missed in the first cache, and then using a relatively cost-effective arrangement for fetching data into the first and second caches that ensures that the appropriate data will (eventually) be fetched into those caches.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system when performing a graphics texturing operation, the method comprising:

when a graphics texturing operation requires texel data that is stored in a texel cache of the graphics processing system and the fetching of the texel data into the texel cache for use by the graphics texturing operation is dependent upon further mip-map address data stored in a second cache of the graphics processing system the mip-map address data comprising a memory location of the texel data or information to allow determination of a memory location of the texel data:

attempting to read the texel data from the texel cache;

in response to the attempt to read the texel data from the texel cache finding that the texel data is stored in the texel cache:

reading the texel data from the texel cache and performing the graphics texturing operation using the read texel data, wherein mip-map address data is not read from the second cache;

and in response to the attempt to read the texel data from the texel cache other than finding that the texel data is stored in the texel cache:

stalling the graphics texturing operation;

adding the graphics texturing operation to a record of graphics texturing operations for which texel data has been attempted to be read from the texel cache and for which it was found that the texel data was not present in the texel cache;

fetching the texel data into the texel cache, wherein fetching the texel data into the texel cache includes reading the mip-map address data from the second cache and using the mip-map address data read from the second cache to fetch the texel data into the texel cache; and when the texel data has been fetched into the texel cache, identifying from the record of graphics texturing operations the graphics texturing operation awaiting the texel data that has been fetched into the texel cache, reading the fetched texel data from the texel cache for the identified graphics texturing operation and performing the identified graphics texturing operation using the read texel data.

2. The method of claim 1, further comprising:
associating state information with each cache line in the texel cache;
wherein each cache line of the texel cache can be indicated as having one of four states:
a state meaning that the line is not in use and does not contain any valid data;
a state meaning that the line is allocated to receive data and the data for it is still to be requested from storage;
a state meaning that the line is allocated to receive data and the data for the line has been requested from storage; and
a state meaning that the line contains valid data.

3. The method of claim 1, wherein fetching the texel data into the texel cache in response to the attempt to read the texel data from the texel cache other than finding that the texel data is stored in the texel cache comprises:
determining whether there is an available cache line in the texel cache for receiving the texel data; and
when it is determined that there is a cache line in the texel cache available for receiving the texel data:
allocating an available cache line in the texel cache to receive the texel data; and
setting an indication to indicate that the allocated cache line in the texel cache is allocated to receive data and that the data for the line is still to be requested from storage where that data is stored.

4. The method of claim 3, wherein the fetching of the texel data into the texel cache in response to the attempt to read texel data from the texel cache other than finding that the texel data is stored in the texel cache comprises:
scanning the cache lines in the texel cache in turn in a scanning order to identify the next line in the texel cache in the scanning order that is indicated as being allocated to receive data and for which the data for the line is still to be requested from storage where that data is stored; and
attempting to fetch the data for the identified line into the identified line in the texel cache.

5. The method of claim 4, wherein attempting to fetch the data for the identified line into the identified line in the texel cache comprises:
attempting to read the mip-map address data from the second cache; and
in response to the attempt to read the mip-map address data in the second cache finding that the mip-map address data is stored in the second cache:
reading that mip-map address data from the second cache; and
using that mip-map address data to send a fetch request to load the texel data into the texel cache.

6. The method of claim 4, wherein attempting to fetch the data for the identified line into the identified line in the texel cache comprises:
attempting to read the mip-map address data from the second cache; and
in response to the attempt to read the mip-map address data from the second cache other than finding that the mip-map address data is stored in the second cache:
leaving the identified cache line in the texel cache as being indicated that the line is allocated to receive data and for which the data for the line is still to be requested from storage where that data is stored;
and
continuing the scanning of the cache lines in the texel cache in turn in the scanning order to identify the next line in the texel cache in the scanning order that is indicated as being allocated to receive data and for which the data for the line is still to be requested from storage where that data is stored.

7. The method of claim 4, wherein attempting to fetch the data for the identified line into the identified line in the texel cache comprises:
attempting to read the mip-map address data from the second cache; and
in response to the attempt to read the mip-map address data from the second cache other than finding that the mip-map address data is stored in the second cache:
fetching the mip-map address data into the second cache; and
when the mip-map address data has been fetched into the second cache:
reading that mip-map address data from the second cache; and
using that mip-map address data to fetch the texel data into the texel cache.

8. The method of claim 7, wherein fetching the mip-map address data into the second cache comprises:
determining whether there is an available cache line in the second cache for receiving the mip-map address data; and
when it is determined that there is a cache line in the second cache available for receiving the mip-map address data:
allocating an available cache line in the second cache to receive the mip-map address data; and
configuring the graphics processing system to ensure that the fetch of the mip-map address data into the allocated line in the second cache will happen.

9. The method of claim 7, wherein fetching the mip-map address data into the second cache comprises:
determining whether there is an available cache line in the second cache for receiving the mip-map address data; and
once it is determined that there is not a cache line in the second cache available for receiving mip-map address data:
recording which cache line in the texel cache has failed to have an available cache line allocated in the second cache; and
preventing any other cache line in the texel cache from being allocated a cache line in the second cache until the cache line in the texel cache that failed to have an available cache line in the second cache allocated to it has had a cache line in the second cache allocated to it.

10. The method of claim 7, further comprising once mip-map address data has been fetched into a cache line of the second cache, locking that cache line of the second cache such that it cannot be evicted from the second cache until all the lines in the texel cache have been scanned at least once after the data was loaded into the line of the second cache.

11. A graphics processing system, the processing system comprising:
graphics texturing operation circuitry operable to perform a graphics texturing operation;
a texel cache operable to store texel data for use by the graphics texturing operation circuitry when performing a graphics texturing operation;
a second cache operable to store mip-map address data required for fetching texel data into the texel cache for use in a graphics texturing operation, the mip-map address data comprising a memory location of the texel data or information to allow determination of a memory location of the texel data;
wherein:
the graphics texturing operation circuitry is configured to attempt to read texel data that is required for a graphics texturing operation from the texel cache;
the graphics processing system further comprises processing circuitry configured to, in response to the attempt to read the texel data from the texel cache finding that the texel data is stored in the texel cache:
read the texel data from the texel cache and perform the graphics texturing operation using the read texel data, wherein mip-map address data is not read from the second cache;
and
the graphics processing system further comprises processing circuitry configured to, in response to the attempt to read the texel data from the texel cache other than finding that the texel data is stored in the texel cache:
stall the graphics texturing operation;
add the graphics texturing operation to a record of graphics texturing operations for which texel data has been attempted to be read from the texel cache and for which it was found that the texel data was not present in the texel cache;
fetch the texel data into the texel cache, wherein the texel data into the texel cache includes reading the mip-map address data from the second cache and using the mip-map address data read from the second cache to fetch the texel data into the texel cache; and
when the texel data has been fetched into the texel cache, identify from the record of graphics texturing operations a graphics texturing operation or operations awaiting the texel data that has been fetched into the texel cache, and cause the graphics texturing operation circuitry to read the fetched texel data from the texel cache for the identified graphics texturing operation or operations and to perform the identified graphics texturing operation or operations using the read texel data.

12. The system of claim 11, further comprising processing circuitry configured to:
associate state information with each cache line in the texel cache;
wherein each cache line of the texel cache can be indicated as having one of four states:
a state meaning that the line is not in use and does not contain any valid data;
a state meaning that the line is allocated to receive data and the data for it is still to be requested from storage;
a state meaning that the line is allocated to receive data and the data for the line has been requested from storage; and
a state meaning that the line contains valid data.

13. The system of claim 11, wherein the fetching of the texel data into the texel cache in response to the attempt to read the texel data from the texel cache other than finding that the texel data is stored in the texel cache comprises:
determining whether there is an available cache line in the texel cache for receiving the texel data;
and
when it is determined that there is a cache line in the texel cache available for receiving the texel data:
allocating an available cache line in the texel cache to receive the texel data; and
setting an indication to indicate that the allocated cache line in the texel cache is allocated to receive data and that the data for the line is still to be requested from storage where that data is stored.

14. The system of claim 13, wherein the fetching of the texel data into the texel cache in response to the attempt to read texel data from the texel cache other than finding that the texel data is stored in the texel cache comprises:
scanning the cache lines in the texel cache in turn in a scanning order to identify the next line in the texel cache in the scanning order that is indicated as being allocated to receive data and for which the data for the line is still to be requested from storage where that data is stored; and
attempting to fetch the data for the identified line into the identified line in the texel cache.

15. The system of claim 14, wherein attempting to fetch the data for the identified line into the identified line in the texel cache comprises:
attempting to read the mip-map address data from the second cache; and
in response to the attempt to read the mip-map address data in the second cache finding that the mip-map address data is stored in the second cache:
reading that mip-map address data from the second cache; and
using that mip-map address data to send a fetch request to load the texel data into the texel cache.

16. The system of claim 14, wherein attempting to fetch the data for the identified line into the identified line in the texel cache comprises:
attempting to read the mip-map address data from the second cache; and
in response to the attempt to read the mip-map address data from the second cache other than finding that the mip-map address data is stored in the second cache:
leaving the identified cache line in the texel cache as being indicated that the line is allocated to receive data and for which the data for the line is still to be requested from storage where that data is stored;
and
continuing the scanning of the cache lines in the texel cache in turn in the scanning order to identify the next line in the texel cache in the scanning order that is indicated as being allocated to receive data and for which the data for the line is still to be requested from storage where that data is stored.

17. The system of claim 14, wherein attempting to fetch the data for the identified line into the identified line in the texel cache comprises:
attempting to read the mip-map address data from the second cache; and in response to the attempt to read the mip-map address data from the second cache other than finding that the mip-map address data is stored in the second cache:
fetching the mip-map address data into the second cache; and
when the mip-map address data has been fetched into the second cache:
reading that mip-map address data from the second cache; and
using that mip-map address data to fetch the texel data into the texel cache.

18. The system of claim 17, wherein fetching the mip-map address data into the second cache comprises:
determining whether there is an available cache line in the second cache for receiving the mip-map address data; and
when it is determined that there is a cache line in the second cache available for receiving the mip-map address data:
allocating an available cache line in the second cache to receive the mip-map address data; and
configuring the graphics processing system to ensure that the fetch of the mip-map address data into the allocated line in the second cache will happen.

19. The system of claim 17, wherein fetching the mip-map address data into the second cache comprises:
determining whether there is an available cache line in the second cache for receiving the mip-map address data; and
once it is determined that there is not a cache line in the second cache available for receiving mip-map address data:
recording which cache line in the texel cache has failed to have an available cache line allocated in the second cache; and
preventing any other cache line in the texel cache from being allocated a cache line in the second cache until the cache line in the texel cache that failed to have an available cache line in the second cache allocated to it has had a cache line in the second cache allocated to it.

20. The system of claim 17, further comprising processing circuitry configured to, once mip-map address data has been fetched into a cache line of the second cache, lock that cache line of the second cache such that it cannot be evicted from the second cache until all the lines in the texel cache have been scanned at least once after the data was loaded into the line of the second cache.

21. A non-transitory computer readable storage medium storing computer software code which when executing on a processor performs a method of operating a graphics processing system when performing a graphics texturing operation, the method comprising:
when a graphics texturing operation requires texel data that is stored in a texel cache of the graphics processing system and the fetching of the texel data into the texel cache for use by the graphics texturing operation is dependent upon further mip-map address data stored in a second cache of the graphics processing system, the mip-map address data comprising a memory location of the texel data or information to allow determination of a memory location of the texel data:
attempting to read the texel data from the texel cache;
in response to the attempt to read the texel data from the texel cache finding that the texel data is stored in the texel cache:
reading the texel data from the texel cache and performing the graphics texturing operation using the read texel data, wherein mip-map address data is not read from the second cache;
and
in response to the attempt to read the texel data from the texel cache other than finding that the texel data is stored in the texel cache:
stalling the graphics texturing operation;
adding the graphics texturing operation to a record of graphics texturing operations for which texel data has been attempted to be read from the texel cache and for which it was found that the texel data was not present in the texel cache;
fetching the texel data into the texel cache, wherein fetching the texel data into the texel cache includes reading the mip-map address data from the second cache and using the mip-map address data read from the second cache to fetch the texel data into the texel cache; and
when the texel data has been fetched into the texel cache, identifying from the record of graphics texturing operations the graphics texturing operation awaiting the texel data that has been fetched into the texel cache, reading the fetched texel data from the texel cache for the identified graphics texturing operation and performing the identified graphics texturing operation using the read texel data.

* * * * *

UNITED STATES PATENT AND TRADEMARK OFFICE
CERTIFICATE OF CORRECTION

PATENT NO. : 11,036,644 B2
APPLICATION NO. : 15/423497
DATED : June 15, 2021
INVENTOR(S) : Engh-Halstvedt et al.

It is certified that error appears in the above-identified patent and that said Letters Patent is hereby corrected as shown below:

In the Claims

Column 29, Line 39 (Claim 11, Line 39), please change "texel data" to -- fetching the texel data --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*